(12) United States Patent
Kane

(10) Patent No.: US 7,286,911 B2
(45) Date of Patent: Oct. 23, 2007

(54) AIRCRAFT PILOT ASSISTANCE SYSTEM AND METHOD

(76) Inventor: Richard L. Kane, 6524 Marbletree La., Lake Worth, FL (US) 33467

( * ) Notice: Subject to any disclaimer, the term of this patent is extended or adjusted under 35 U.S.C. 154(b) by 471 days.

(21) Appl. No.: 10/724,543

(22) Filed: Dec. 1, 2003

(65) Prior Publication Data
US 2005/0119802 A1 Jun. 2, 2005

(51) Int. Cl.
G01C 19/00 (2006.01)
G01C 23/00 (2006.01)

(52) U.S. Cl. .............................. 701/9; 701/4; 244/171; 340/967

(58) Field of Classification Search ................ 701/9, 701/4; 244/171; 340/967
See application file for complete search history.

(56) References Cited

U.S. PATENT DOCUMENTS

| | | | |
|---|---|---|---|
| 4,006,632 A * | 2/1977 | Saverio .................... | 73/178 R |
| 5,886,257 A * | 3/1999 | Gustafson et al. ......... | 73/178 R |
| 6,473,676 B2 * | 10/2002 | Katz et al. ................ | 701/4 |
| 6,573,486 B1 * | 6/2003 | Ratkovic et al. ............ | 244/3.2 |
| 6,853,315 B2 * | 2/2005 | Schiller et al. ............. | 340/974 |
| 2003/0137433 A1 * | 7/2003 | Schiller et al. ............. | 340/973 |
| 2005/0119802 A1 * | 6/2005 | Kane .......................... | 701/9 |
| 2005/0192747 A1 * | 9/2005 | Schiller et al. ............. | 701/220 |

FOREIGN PATENT DOCUMENTS

| | | |
|---|---|---|
| AU | 2003217208 A8 * | 10/2005 |
| EP | 1468249 A2 * | 10/2004 |
| EP | 1476710 A1 * | 11/2004 |
| GB | 2039674 A * | 8/1980 |
| WO | WO 03078916 A1 * | 9/2003 |

OTHER PUBLICATIONS

J. J. Devore, Interfacing sensor assemblies with windowless cockpit displays; Instrumentation and Measurement, IEEE Transactions on; vol. 37, Issue 4, Dec. 1988 pp. 501-505; Digital Object Identifier 10.1109/19.9800.*

M. Kayton, Navigation: ships to space; Aerospace and Electronic Systems, IEEE Transactions on;vol. 24, Issue 5, Sep. 1988 pp. 474-519; Digital Object Identifier 10.1109/7.9678.*

D. Gebre-Egziabher et al., Design of multi-sensor attitude determination systems; Aerospace and Electronic Systems, IEEE Transactions on, vol. 40, Issue 2, Apr. 2004 pp. 627-649; Digital Object Identifier 10.1109/TAES.2004.1310010.*

(Continued)

Primary Examiner—Cuong Nguyen
(74) Attorney, Agent, or Firm—Law Office of Art Dula

(57) ABSTRACT

A system and method for assisting a pilot to recover the aircraft from a variety of dangerous situations involving one or more of the following: altitude, airspeed, attitude, roll rate, and a partial equipment failure in the control panel. In accordance with the invention, these factors are sensed automatically, and voice instructions are provided to the pilot to direct him or her to get the aircraft out of the dangerous situation sensed by this system.

30 Claims, 3 Drawing Sheets

OTHER PUBLICATIONS

Y. Oshman et al., Mini-UAV altitude estimation using an inertially stabilized payload; Aerospace and Electronic Systems, IEEE Transactions on; vol. 35, Issue 4, Oct. 1999 pp. 1191-1203; Digital Object Identifier 10.1109/7.805437.*

F. Ozguner et al., A reconfigurable multiprocessor architecture for reliable control of robotic systems; Robotics and Automation. Proceedings. 1985 IEEE International Conference on; vol. 2, Mar. 1985 pp. 802-806.*

Chang-Sun Yoo et al., Low cost GPS/INS sensor fusion system for UAV navigation; Digital Avionics Systems Conference, 2003. DASC '03. The 22$^{nd}$.vol. 2, Oct. 12-16, 2003 pp. 8.A.1-8.1-9 vol. 2, Digital Object Identifier 10.1109/DASC.2003.1245891.*

* cited by examiner

AIRCRAFT PILOT ASSISTANCE SYSTEM AND METHOD

BACKGROUND OF THE INVENTION

Field of the Invention

This invention relates to a recovery system and method for detecting and warning a pilot of an unsafe attitude of the aircraft and providing voice instructions to help the pilot recover the aircraft from a presently or potentially dangerous situation.

Many aircraft accidents caused by pilot error involve the pilot's failure to maintain a safe altitude and/or the pilot's spatial disorientation. The pilot may have the aircraft in a nose-high attitude which can produce a stall, or in a nose-low attitude which can put it in a descending spiral. These problems can occur to a VFR (visual flight rules) pilot who inadvertently flies into instrument meteorological conditions (IMC), to and IFR (instrument flight rules) pilot who is out of practice, or to any pilot who suffers hypoxia, fatigue, or another condition that temporarily affects his/her flying ability. To recover the aircraft from a dangerous attitude involves procedures which a disoriented pilot may not have the presence of mind to execute.

In addition, turbulence may cause the aircraft to depart controlled flight, or there may be a partial equipment failure of the vacuum system on the aircraft that powers the instrument panel on which the pilot relies. Navigation during partial panel failure requires additional pilot attention to the aircraft's heading using the demanding technique of "timed turns." Without a warning system it is difficult for the pilot to identify a partial panel failure because the failure typically takes place gradually as the aircraft's gyros spin down and destabilize.

Another factor affecting aircraft safety is the particular terrain over which the aircraft is flying and obstacles which project up from the ground and thus determine the minimum safe altitude (MSA) for flight.

In the United States the altitude determination problem has been alleviated by the Global Positioning System (GPS), a satellite-based radio navigation system using multiple satellites. By triangulation of signals from three of them, an on-board receiver can pinpoint the aircraft's current position. GPS accuracy has been significantly improved by the introduction of the Wide Area Augmentation System (WAAS), with a margin of error of only a few meters, both horizontally and vertically. WAAS provides ILS-like precision approaches to airports that do not have ILS (Instrument Landing System). Also, WAAS provides information on the status of the GPS system, notifying a pilot in the event that the GPS system becomes unreliable temporarily.

SUMMARY OF THE INVENTION

The present invention is directed to an aircraft pilot assistance system and method that detects an unsafe altitude and a dangerous nose-up or nose-down condition of the aircraft, and provides appropriate voice warnings and directions to help the pilot overcome the problem or problems detected, even if the pilot remains spatially disoriented, fatigued, or otherwise at less than his or her usual flying ability.

The present invention continuously reads the aircraft's altitude, roll rate, and nose-high or nose-low position, and combines these readings to initiate appropriate voice messages to assist the pilot to recover the aircraft to a safe condition. The altitude determination comes from a GPS/WAAS feed to a receiver connected to a computer on-board the aircraft. The nose-high or nose-low condition is determined from GPS signals and from on-board solid state gyros. The roll rate determination is derived from GPS signals and from the solid state gyros and a turn coordinator gyro on the aircraft.

In the event of both an excessive altitude excursion and an excessive roll rate of the aircraft, the system initiates voice messages to the pilot's stereo headset to assist him or her to take the proper corrective action, depending on whether a nose-low or a nose-high condition has been detected. Voice messages pertaining to wing-leveling preferably are sent only to the earpiece on the side of the headset that corresponds to the low-wing side of the aircraft.

The present invention also responds to a partial failure of the aircraft's instrument panel to initiate a series of voice instructions which assist the pilot to perform "timed turns" routine for aircraft safety.

A general object of this invention is to provide a novel and advantageous system and method for assisting a pilot to restore the aircraft form an unsafe condition to a safe attitude and altitude appropriate to the terrain over which the aircraft is flying.

Further objects and advantages of this invention will be apparent from the following detailed description of a presently preferred embodiment thereof, with reference to the accompanying drawings.

DETAILED DESCRIPTION OF THE INVENTION

Before explaining the present invention in detail it is to be understood that the invention is not limited in its application to the particular arrangement shown and described since the invention is capable of other embodiments. Also, the terminology used herein is for the purpose of description and not of limitation.

Figure 1:
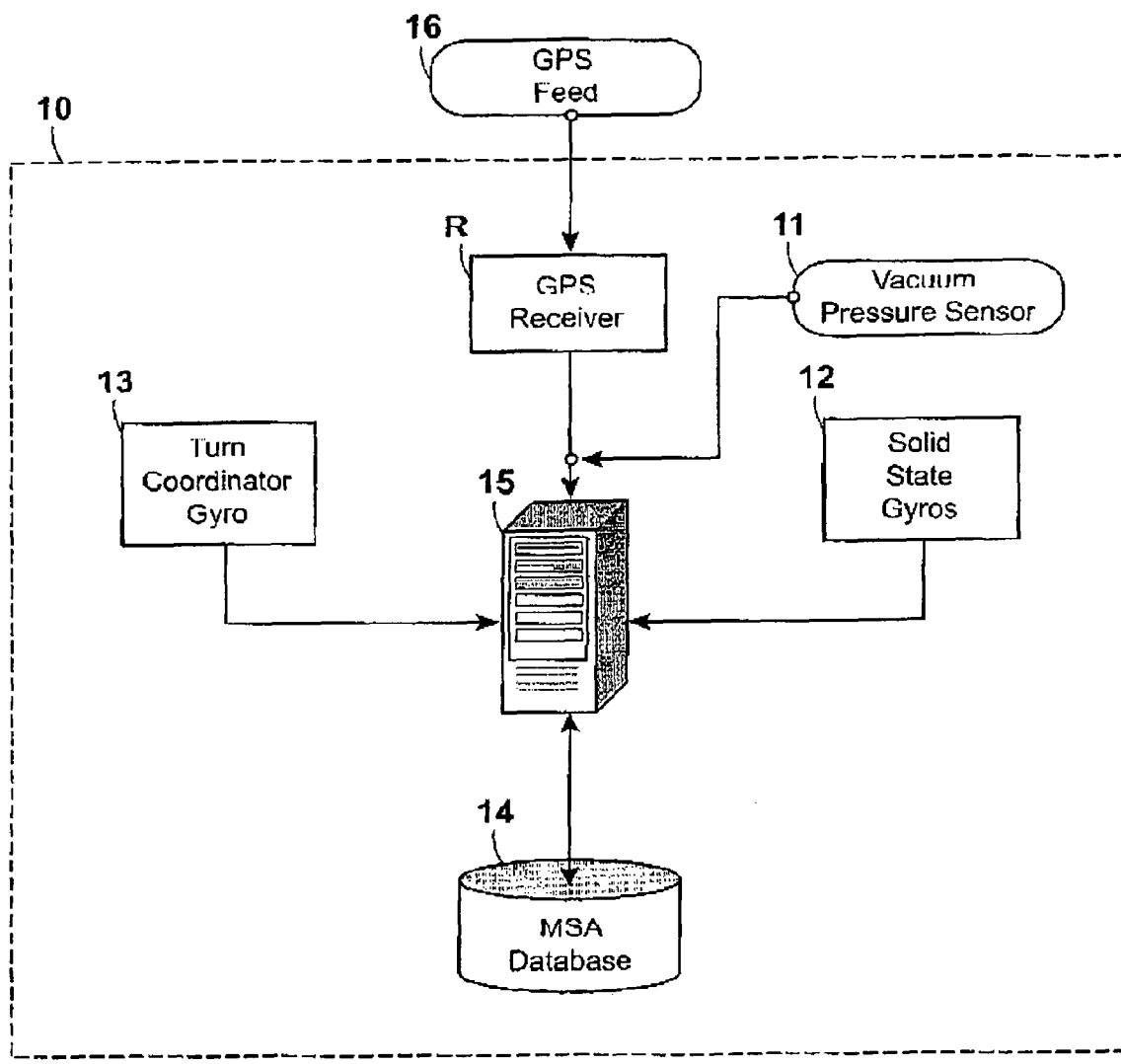
FIG. 1 is a block diagram showing the major inputs in the present system and method.

As indicated in FIG. 1, the aircraft 10 carries:

a GPS/WAAS-enabled radio receiver R having a GPS receiver card for receiving GPS signals giving the aircraft's altitude, forward speed and magnetic heading;

a vacuum pressure sensor or transducer 11 which senses a failure in the vacuum system that powers the instrument panel readings on which the pilot relies to know the attitude, heading, and other vital information;

solid state gyros 12 and a turn coordinator gyro 13 which monitor the aircraft's roll rate;

a flight recorder FR which records every 15 seconds on a hard disk the flight path of the aircraft with its heading, speed, location and altitude;

and a microprocessor-based computer 15 for collating and processing the information supplied to it from the receiver R, the vacuum pressure sensor 11, gyros 12 and 13, and other sources, as explained hereinafter. This computer runs an expert system algorithm, as explained hereinafter.

Stored in the computer 15 is an MSA/approach database 14 which provides information regarding the approaches being flown by the aircraft, the minimum descent altitude, decision altitude, and minimum safe altitude for airways and sectors, taking into account the terrain over which the plane is flying and obstacles on the ground along the flight path that determine the minimum safe altitude. This database is interfaced with the remainder of the system to provide warnings of an unsafe altitude. Within three miles of an airport this feature automatically de-activates to enable the landing approach to be performed without false alarms being triggered.

Computer 15 receives, from a GPS feed 16, GPS/WAAS navigation signals which tell the instantaneous air speed of the aircraft, its altitude, and its magnetic heading to initiate voice warnings and recovery instructions to the pilot. A large delta in the aircraft's altitude, an excursion to an unsafe altitude, a large delta in the aircraft's heading, an increase or decrease in airspeed, or a combination of two or more of these factors will trigger a scoring system programmed in the computer 15 to indicate an unusual attitude and will instantly analyze this unusual attitude to initiate recovery voice instructions to the pilot. To this end, the computer 15 has an audio output connected to the pilot's stereo headset to deliver voice messages to one or both of the pilot's ears, depending upon the particular warning signal the computer has just received from the GPS feed and the gyros.

In accordance with the minimum safe altitude warning, the present system monitors the current altitude via the GPS feed and compares that to the MSA for the region being flown over. This feature is disabled when the plane arrives within 3 miles of an airport, to enable the approach to be flown without false alarms being triggered.

In accordance with the approach monitoring capability, the present system monitors the aircraft's height above the Minimum Descent Altitude (MDA) or Decision Altitude (DA) and provides voice warnings to the pilot in hundreds of feet, and then in tens of feet, as the aircraft approaches the DA. Additionally, for a non-precision approach this system monitors the distance from the aircraft to the Missed Approach Point (MAP) and warns of reaching the MAP.

Figure 2:
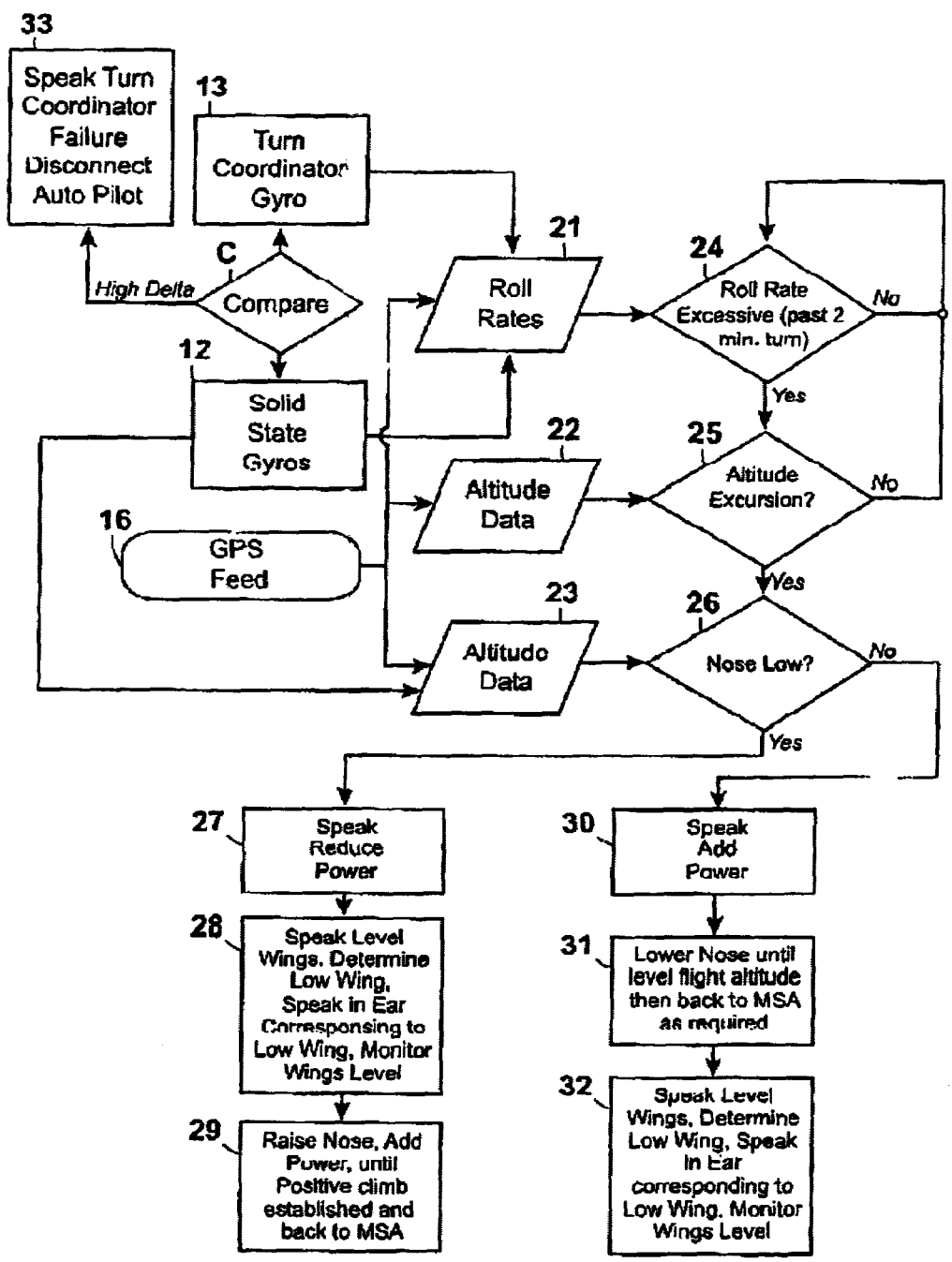
FIG. 2 is a flow chart detailing the main features of the correlation algorithm for the present system and method for critical attitude recovery of an aircraft.

FIG. 2 is a flow chart which details the main features of the correlation algorithm which the computer 15 runs. In box 21, inputs from the aircraft's turn coordinator gyro 13 and its solid state gyros 12 and the GPS feed 16 are correlated to calculate the aircraft's roll rate, or rate of turn, which indicates the stability of flight. The computed roll rate is constantly monitored to a tolerance of 3 degrees per second, and if the roll rate is within this tolerance (box 24) no corrective action is suggested.

In box 22, altitude data are obtained from the GPS feed 16. If no excessive altitude excursion is in progress (box 25) then no alert is indicated. For example, an altitude change greater than 500 feet per minute may be treated as excessive. Conversely, if an excessive altitude excursion is detected in combination with an excessive roll rate, a spatial disorientation event is judged to be in progress.

In box 23, attitude data is derived from both the GPS feed 16 and the solid state gyros 12.

In box 26, a nose-high/nose-low determination is made by use of the attitude data (box 23) and the altitude direction of change (box 25). If a nose-low condition of the aircraft is determined (box 26), the pilot receives appropriate voice notifications and instructions from the computer 15 to assist him or her to restore the aircraft to safe attitude and altitude. Box 27 instructs the pilot (in both ears) to reduce the engine power. Box 28 instructs the pilot (in one ear only) to level the wings, giving voice information to the pilot's ear (left or right) corresponding to the low wing, and then monitors the wings level and gives a voice prompt to the pilot when wings level is achieved. Once the wings are leveled, box 29 instructs the pilot by voice (in both ears) to gently raise the aircraft's nose and add power until a positive climb is established and the aircraft is back at the minimum safe altitude for the area it is flying over.

Conversely, if a nose-high condition of the aircraft is determined (box 26), the pilot receives appropriate voice notifications from computer 15 to recover the aircraft from this condition. Box 30 instructs the pilot (in both ears) to increase the engine power. Box 31 instructs the pilot (in both ears) to gently lower the nose of the aircraft and add power until a level attitude is established and the aircraft is back at the minimum safe altitude for the area. Box 32 instructs the pilot (in one ear) to level the wings, speaking into the ear (left or right) corresponding to the low wing, and then monitors the wings level and gives a voice prompt to the pilot when wings level is achieved.

In box C, the turn coordinator gyro 13 is compared to the solid state gyros 12, and in the event of a significant discrepancy between them (due to an error in the turn coordinator gyro) block 33 announces this to the pilot and instructs him or her to turn off the aircraft's automatic pilot. Such a failure of the turn coordinator gyro, while rare, does occur on occasion and when it does the present system responds in a way to avoid danger to the aircraft.

Another aspect of the present system relates to warning the pilot of a partial failure of the aircraft's instrument panel, with the accompanying loss of the heading and attitude indicators, and directing the pilot in the demanding technique of "timed turns" to respond to this problem.

Figure 3:
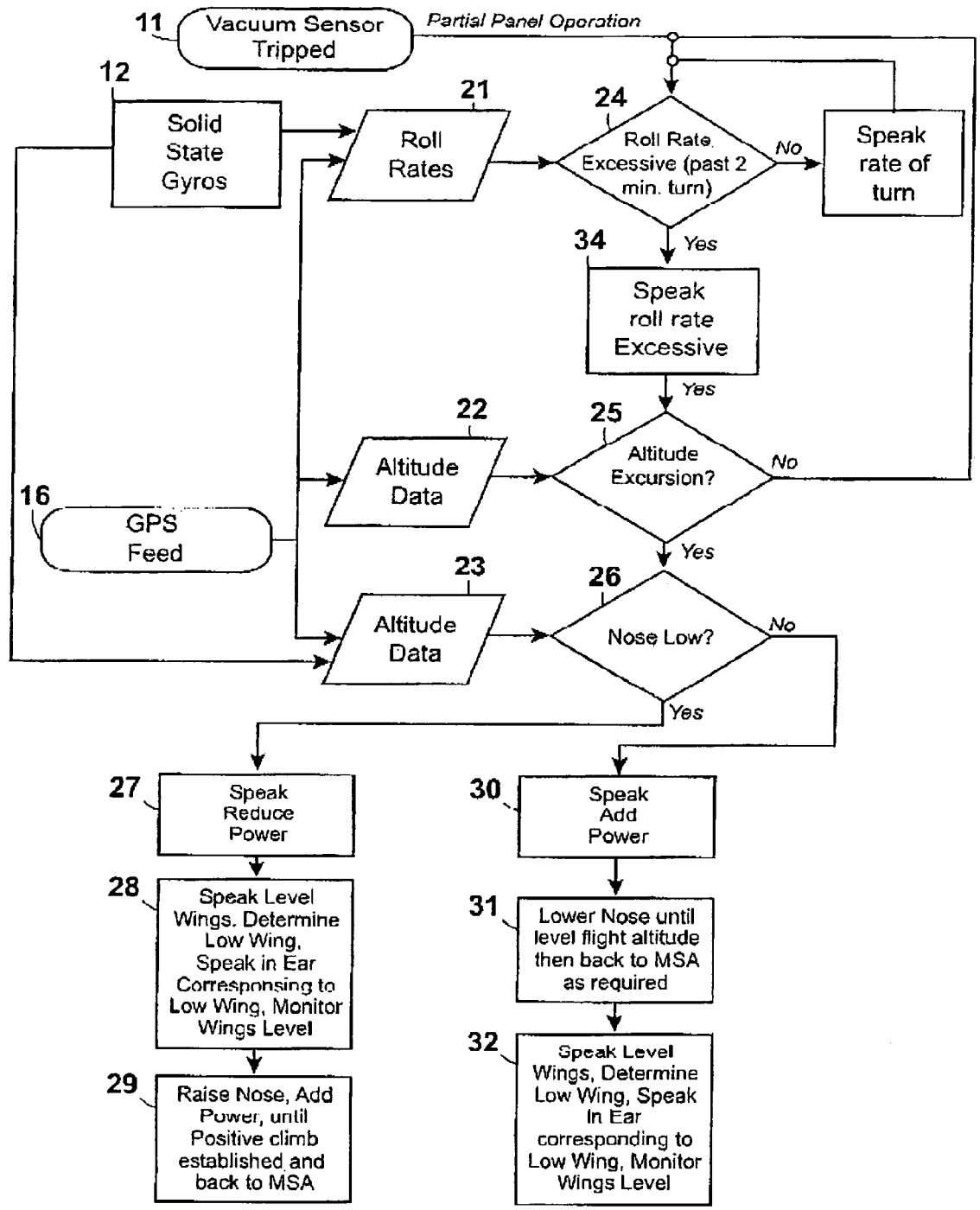
FIG. 3 is a similar flow chart pertaining to a partial failure of one or more vacuum powered instruments on the aircraft's instrument panel.

For this purpose the present system includes a vacuum sensor switch 11 (FIG. 3) operatively connected to the vacuum line to detect a partial failure of one or more vacuum powered instrument panel units (typically, the directional gyro and/or the artificial horizon or attitude indicator). The vacuum sensor triggers a response by computer 15 to cause the GPS signals to be automatically timed to give an approximation of the aircraft's turn rate (block 21 in FIG. 3). If the roll rate determined from the timed GPS signals becomes excessive (i.e., past the 2 minute turn standard) a voice warning to this effect is delivered to the pilot (block 34) and the pilot is given instructions (block 35) for getting the aircraft into a standard turn rate, for notifying the pilot when the standard turn rate is established, and for notifying the pilot when the aircraft passes through the eight cardinal headings.

From the foregoing it will be evident that the system and method of the present invention constitutes an effective and advantageous way of assisting a pilot to recover from a variety of situations that can endanger the aircraft and those on board.

I claim:

1. A system for assisting a pilot flying an aircraft having solid state gyros and a turn coordinator gyro on-board, comprising:
   means on-board the aircraft for obtaining a continuous determination of the aircraft's altitude from satellite-based radio navigation signals;

means on-board the aircraft for obtaining a continuous determination of the aircraft's attitude from satellite-based radio navigation signals and from said solid state gyros on-board the aircraft;

means on-board the aircraft for determining the roll rate of the aircraft from satellite-based radio navigation signals and from said solid state gyros and said turn coordinator gyro on-board the aircraft;

data processing means on-board the aircraft for processing said altitude, attitude and roll rate determinations; and means on-board the aircraft responsive to said data processing means for providing corrective voice messages to the pilot.

2. A system according to claim 1, wherein said data processing means includes means for detecting the magnitude and direction of any excessive altitude excursion of the aircraft in a predetermined time interval, and means for detecting any excessive roll rate of the aircraft; and said means for providing corrective voice messages to the pilot produces a first series of corrective voice messages when the aircraft has both an excessive roll rate and an excessive altitude excursion downward, and a second series of corrective voice messages, different from the first, when the aircraft has both an excessive roll rate and an excessive altitude excursion upward.

3. A system according to claim 1, wherein said data processing means comprises: a safe altitude/approach database for the terrain over which the aircraft is flying; and computer means for comparing said continuous altitude determination against said database to initiate a voice warning to the pilot when the aircraft is at an unsafe altitude.

4. A system according to claim 3, and further comprising: means for disabling the comparison of said continuous altitude determination against said database when the aircraft is within a predetermined approach distance to an airport.

5. A system according to claim 2, wherein said data processing means also comprises: a safe altitude/approach database for the terrain over which the aircraft is flying; and means for comparing said continuous altitude determination against said database to initiate a voice warning to the pilot when the aircraft is at an unsafe altitude.

6. A system according to claim 5, and further comprising: means for disabling the comparison of said continuous altitude determination against said database when the aircraft is within a predetermined approach distance to an airport.

7. A system according to claim 2, wherein said first series of messages is initiated when the aircraft is nose-low and instructs the pilot: first, to reduce the aircraft engine power; next, to level the wings; and, after that, to raise the aircraft nose and increase engine power to establish a climb.

8. A system according to claim 2, wherein said second series of messages is initiated when the aircraft is nose-high and instructs the pilot: first, to increase the aircraft engine air power; next, to lower the aircraft nose; and, after that, to level the wings.

9. A system according to claim 2, wherein:

said first series of messages is initiated when the aircraft is nose-low and instructs the pilot: first, to reduce the aircraft engine power; next, to level the wings; and, after that, to raise the aircraft nose and increase engine power to establish a climb;

and said second series of messages is initiated when the aircraft is nose-high and instructs the pilot: first, to increase the aircraft engine air power; next, to lower the aircraft nose; and, after that, to level the wings.

10. A system according to claim 5, wherein:

said first series of messages is initiated when the aircraft is nose-low and instructs the pilot: first, to reduce the aircraft engine power; next, to level the wings; and, after that, to gently raise the aircraft nose and increase engine power to establish a climb;

and said second series of messages is initiated when the aircraft is nose-high and instructs the pilot: first, to increase the aircraft engine air power; next, to lower the aircraft nose; and, after that, to level the wings.

11. A system according to claim 10, and further comprising: means for disabling the comparison of said continuous altitude determination against said database when the aircraft is within a predetermined approach distance to an airport.

12. A system according to claim 9 and further comprising: a stereo headset with left and right earpieces worn by the pilot and operative to receive said voice signals, and wherein:

said first series of signals includes leveling messages only to the earpiece of said headset corresponding to the low wing; and said second series of signals includes leveling messages only to the earpiece of said headset corresponding to the low wing.

13. A system according to claim 10 and further comprising: a stereo headset with left and right earpieces worn by the pilot and operative to receive said voice signals, and wherein:

said first series of signals includes leveling messages only to the earpiece of said headset corresponding to the low wing; and said second series of signals includes leveling messages only to the earpiece of said headset corresponding to the low wing.

14. A system according to claim 1, and further comprising:

a vacuum pressure sensor on-board the aircraft operatively connected to sense a partial failure of the aircraft's instrument panel; and wherein said data processing means is operatively connected to said receiver to determine the aircraft's heading from satellite-based radio navigation signals and is operatively connected to said vacuum pressure sensor to initiate voice instructions to the pilot, said data processing means being programmed to time said satellite-based radio navigation signals which tell the aircraft's heading and to provide a timed turns voice instruction routine to the pilot.

15. A system according to claim 13, and further comprising:

a vacuum pressure sensor on-board the aircraft operatively connected to sense a partial failure of the aircraft's instrument panel; and wherein said data processing means is operatively connected to said receiver to determine the aircraft's heading from satellite-based radio navigation signals and is operatively connected to said vacuum pressure sensor to initiate voice instructions to the pilot via said headset, said data processing means being programmed to time said satellite-based radio navigation signals which tell the aircraft's heading and to provide a timed turns voice instruction routine to the pilot via said headset.

16. A method of assisting a pilot flying an aircraft having solid state gyros and a turn coordinator gyro on-board, comprising the steps of:
   obtaining a continuous determination of the aircraft's altitude from satellite-based radio navigation signals;
   obtaining a continuous determination of the aircraft's attitude from satellite-based radio navigation signals and from said solid state gyros on-board the aircraft;
   determining the roll rate of the aircraft from satellite-based radio navigation signals and from said solid state gyros and said turn coordinator gyro on-board the aircraft;
   processing said altitude, attitude and roll rate determinations; and
   providing corrective voice messages to the pilot.

17. A method according to claim 16, and further comprising the steps of:
   sensing a partial failure of the aircraft's instrument panel from a vacuum pressure sensor on-board the aircraft;
   determining the aircraft's heading from satellite-based radio navigation signals and initiating voice instructions to the pilot;
   timing said satellite-based radio navigation signals which tell the aircraft's heading; and
   providing timed turns voice instruction routine to the pilot.

18. A method according to claim 16, wherein said processing step includes:
   detecting the magnitude and direction of any excessive altitude excursion of the aircraft in a predetermined time interval, and detecting any excessive roll rate of the aircraft; and
   said step of providing corrective voice messages to the pilot produces a first series of corrective voice messages when the aircraft has both an excessive roll rate and an excessive altitude excursion downward, and a second series of corrective voice messages, different from the first, when the aircraft has both an excessive roll rate and an excessive altitude excursion upward.

19. A method according to claim 16, wherein said processing step comprises:
   comparing said continuous altitude determination against a safe altitude/approach database for the terrain over which the aircraft is flying, and initiating a voice warning to the pilot when the aircraft is at an unsafe altitude.

20. A method according to claim 19, and further comprising the step of disabling the comparison of said continuous altitude determination against said database when the aircraft is within a predetermined approach distance to an airport.

21. A method according to claim 18, wherein said processing step comprises:
   comparing said continuous altitude determination against a safe altitude/approach database for the terrain over which the aircraft is flying and initiating a voice warning to the pilot when the aircraft is at an unsafe altitude.

22. A method according to claim 21, and further comprising the step of disabling the comparison of said continuous altitude determination against said database when the aircraft is within a predetermined approach distance to an airport.

23. A method according to claim 18, wherein said first series of messages is initiated when the aircraft is nose-low and instructs the pilot: first, to reduce the aircraft engine power; next, to level the wings; and, after that, to gently raise the aircraft nose and increase engine power to establish a climb.

24. A method according to claim 18, wherein said second series of messages is initiated when the aircraft is nose-high and instructs the pilot: first, to increase the aircraft engine air power; next, to lower the aircraft nose; and, after that, to level the wings.

25. A method according to claim 18, wherein:
   said first series of messages is initiated when the aircraft is nose-low and instructs the pilot: first, to reduce the aircraft engine power; next, to level the wings; and, after that, to gently raise the aircraft nose and increase engine power to establish a climb;
   and said second series of messages is initiated when the aircraft is nose-high and instructs the pilot: first, to increase the aircraft engine air power; next, to lower the aircraft nose; and, after that, to level the wings.

26. A method according to claim 21, wherein:
   said first series of messages is initiated when the aircraft is nose-low and instructs the pilot: first, to reduce the aircraft engine power; next, to level the wings; and, after that, to gently raise the aircraft nose and increase engine power to establish a climb;
   and said second series of messages is initiated when the aircraft is nose-high and instructs the pilot: first, to increase the aircraft engine air power; next, to lower the aircraft nose; and, after that, to level the wings.

27. A method according to claim 26, and further comprising the step of disabling the comparison of said continuous altitude determination against said database when the aircraft is within a predetermined approach distance to an airport.

28. A method according to claim 25 wherein:
   said first series of signals includes leveling messages only to the pilot's ear corresponding to the low wing;
   and said second series of signals includes leveling messages only to the pilot's ear corresponding to the low wing.

29. A method according to claim 26 wherein:
   said first series of signals includes leveling messages only to the pilot's ear corresponding to the low wing;
   and said second series of signals includes leveling messages only to the pilot's ear corresponding to the low wing.

30. A method according to claim 29, and further comprising the steps of:
   sensing a partial failure of the aircraft's instrument panel from a vacuum pressure sensor on-board the aircraft;
   determining the aircraft's heading from satellite-based radio navigation signals and said solid state gyros, and initiating voice instructions to the pilot;
   timing said satellite-based radio navigation signals and solid state gyros which tell the aircraft's heading;
   and providing timed turns voice instruction routine to the pilot.

\* \* \* \* \*